April 12, 1938.          E. GÖLZ          2,114,076

HYDRAULIC POWER TRANSMISSION MECHANISM

Filed May 28, 1935      4 Sheets-Sheet 1

Inventor:
Emil Gölz
by Karl [illegible]
Atty.

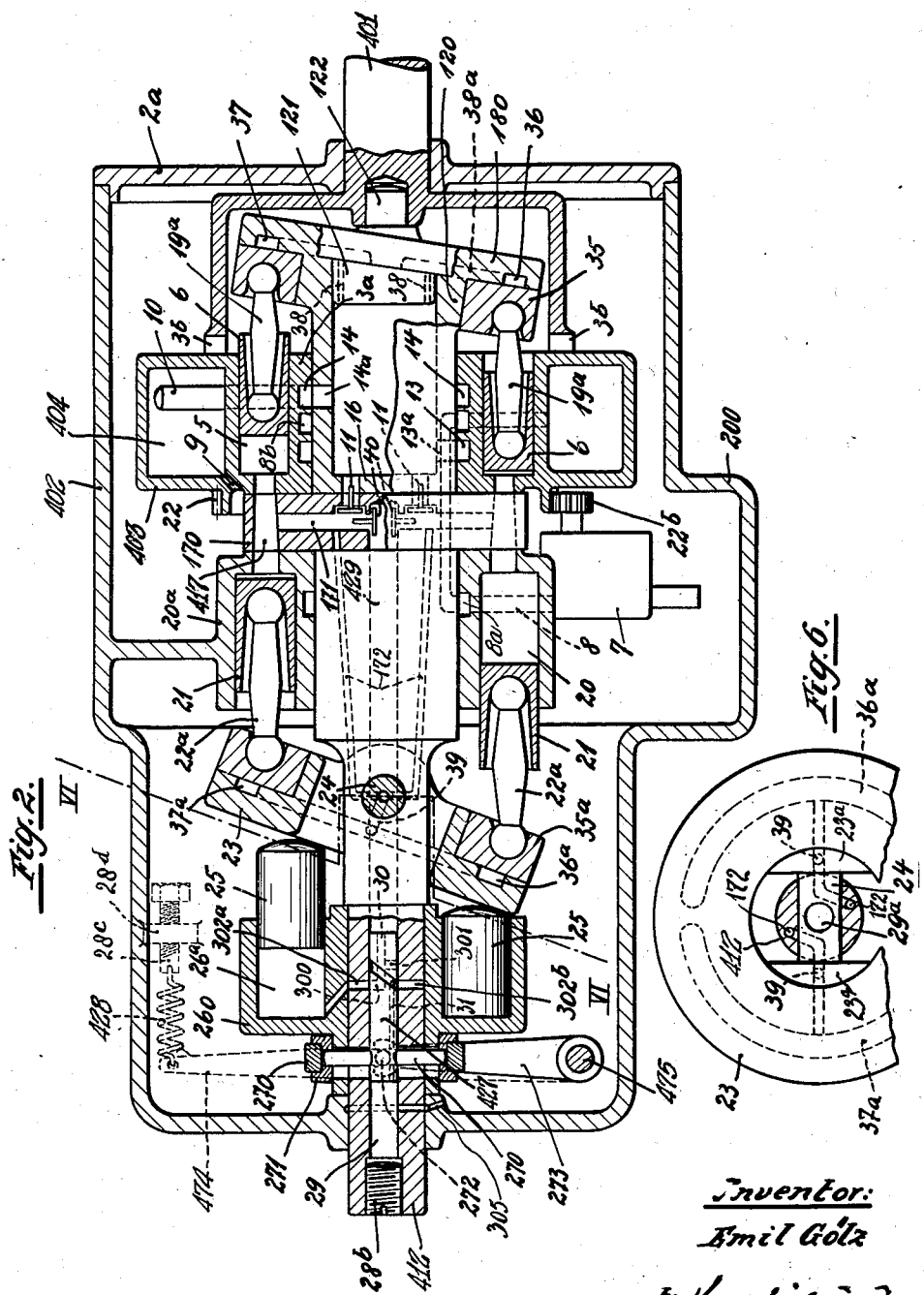

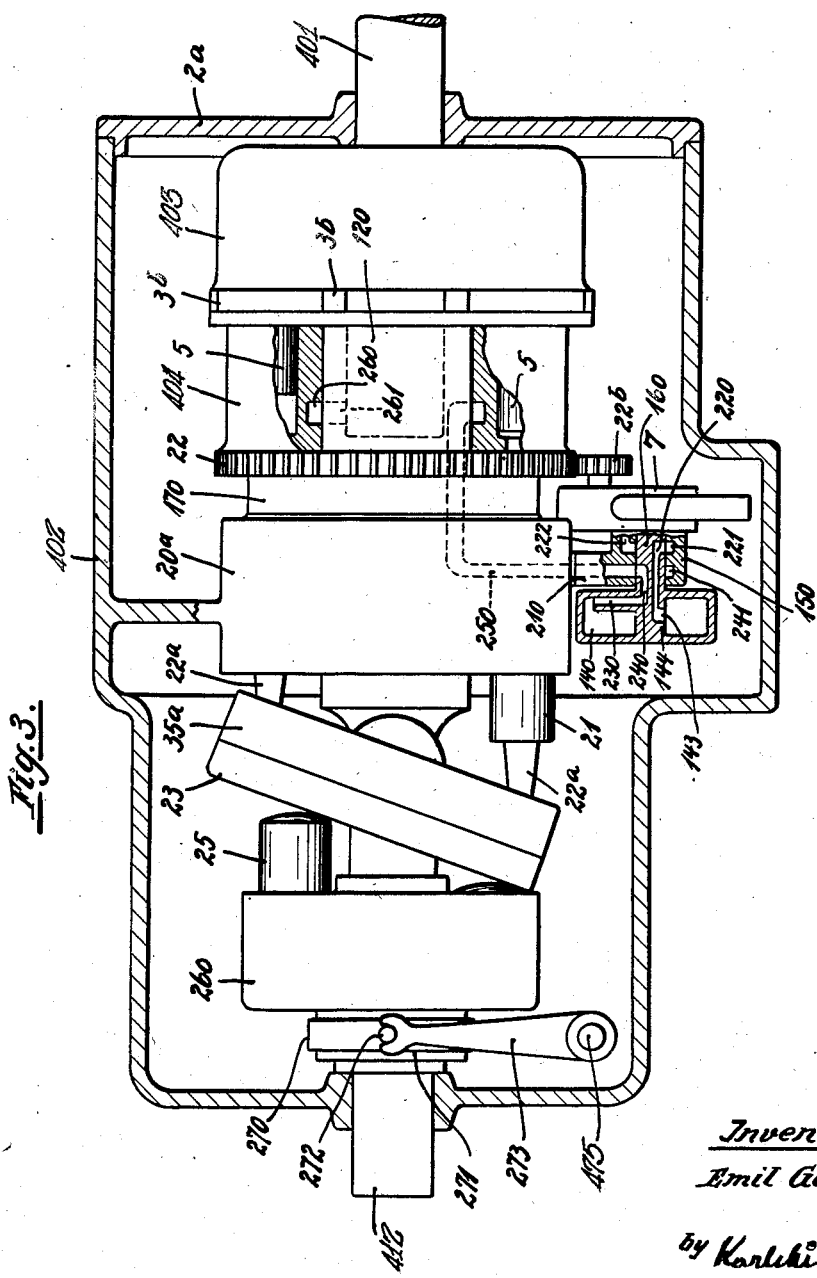

April 12, 1938.　　　　E. GÖLZ　　　　2,114,076
HYDRAULIC POWER TRANSMISSION MECHANISM
Filed May 28, 1935　　　4 Sheets-Sheet 4
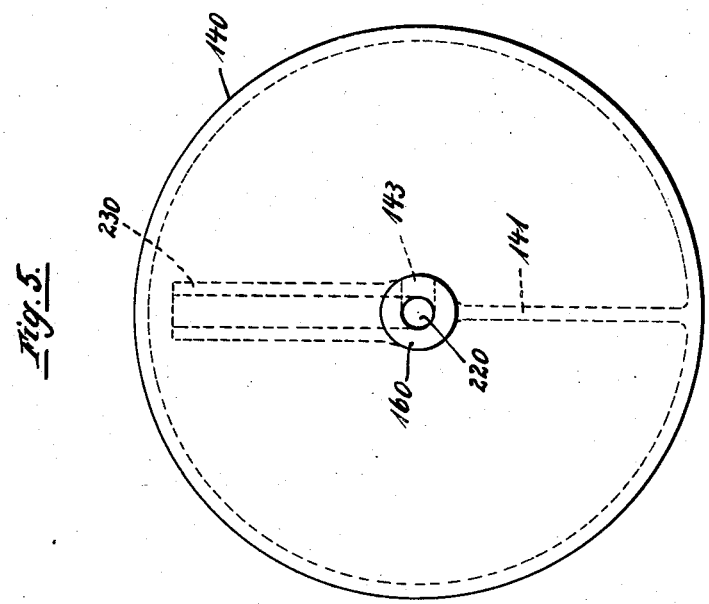
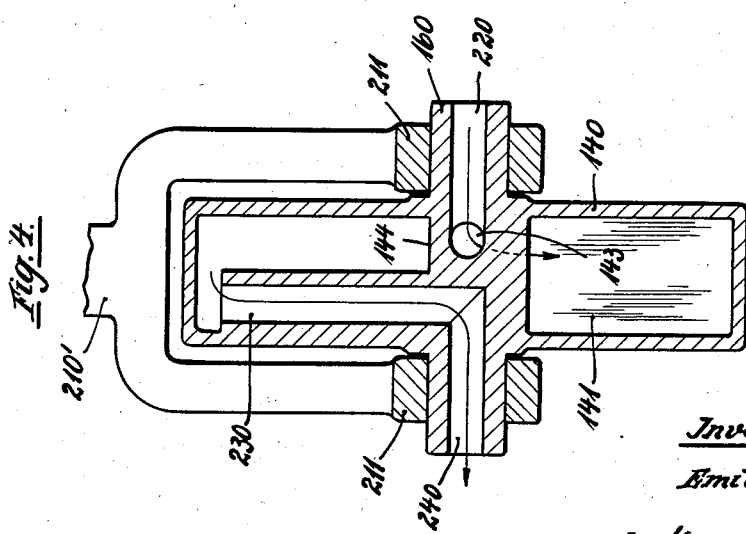
Inventor:
Emil Gölz
by Karl Michaelis
atty.

Patented Apr. 12, 1938

2,114,076

UNITED STATES PATENT OFFICE 2,114,076

HYDRAULIC POWER TRANSMISSION MECHANISM

Emil Gölz, Stuttgart-Degerloch, Germany

Application May 28, 1935, Serial No. 23,890
In Germany June 27, 1934

14 Claims. (Cl. 60—53)

My invention relates to hydraulic power transmission mechanisms, and more particularly to mechanism of the type in which power is transmitted through a pair of rotary members one of which is a swash plate.

It is an object of my invention to provide an improved mechanism of the kind described. To this end, I arrange, in combination with the motor unit on the driven shaft of the mechanism, the pistons which are mounted to slide in this unit in the usual way, and a swash plate which is mounted to oscillate on, and to rotate with, the driven shaft; a set of control pistons which rotate with the driven shaft and are operated by the pressure of the driving liquid, for automatically moving the swash plate to opposite sides of its vertical or direct drive position.

This may be effected by a valve which regulates the admission of driving liquid to, and the discharge of driving liquid from, the cylinders of the control pistons, and is controlled by the differential action of the driving liquid acting on the valve in one direction, and elastic means, such as a spring, acting on the same in the opposite direction.

By these means, the driven shaft is automatically speeded up when the swash plate moves from its vertical position which corresponds to direct drive, to one side, and is retarded when the swash plate moves to the other side; in the first case, the speed of rotation of the driven shaft is limited practically only by frictional resistance. My novel mechanism is distinguished from known mechanisms of a similar kind in that it operates automatically at approximately constant pressure, so that the torque the motor unit exerts is utilized uniformly at all speeds.

Upon any slight variation in the pressure of the driving liquid, such as occurs, for instance, if the resistance to be overcome by a vehicle propelled by my novel mechanism, is increased, liquid is automatically admitted to, and discharged from, the respective cylinders of the control pistons, as required for adapting the angular position of the swash plate to operating conditions.

It is another object of my invention to provide improved means for separating air and gas from the leakage liquid.

To this end, I provide a centrifugal reservoir for separating such inclusions, and for returning the liquid to the mechanism under pressure. The reservoir may be combined with the rotary pump unit of the mechanism, or it may be a separate rotary reservoir which is driven from a leakage pump.

In the drawings affixed to this specification and forming part thereof three types of mechanisms embodying my invention are illustrated diagrammatically by way of example.

In the drawings

Fig. 1 is an axial section of a mechanism embodying the first type in which the swash plate is engaged directly by the power transmitting means of the motor pistons, and the centrifugal reservoir is combined with the pump unit, Fig. 2 is an axial section of a mechanism embodying the second type which is similar to the first type but equipped with liquid-operated cushioning means intermediate the power transmitting means and the motor pistons and the swash plate, Fig. 3 is an axial section of a mechanism embodying the third type which is similar to the second type but equipped with a separate centrifugal reservoir;

Fig. 4 is an axial section, and

Fig. 5 is an end elevation, viewed from the left in Fig. 4, of a modified centrifugal reservoir for the third type, drawn to a larger scale;

Fig. 6 is a section on the line VI—VI in Fig. 2; while

Figure 1:
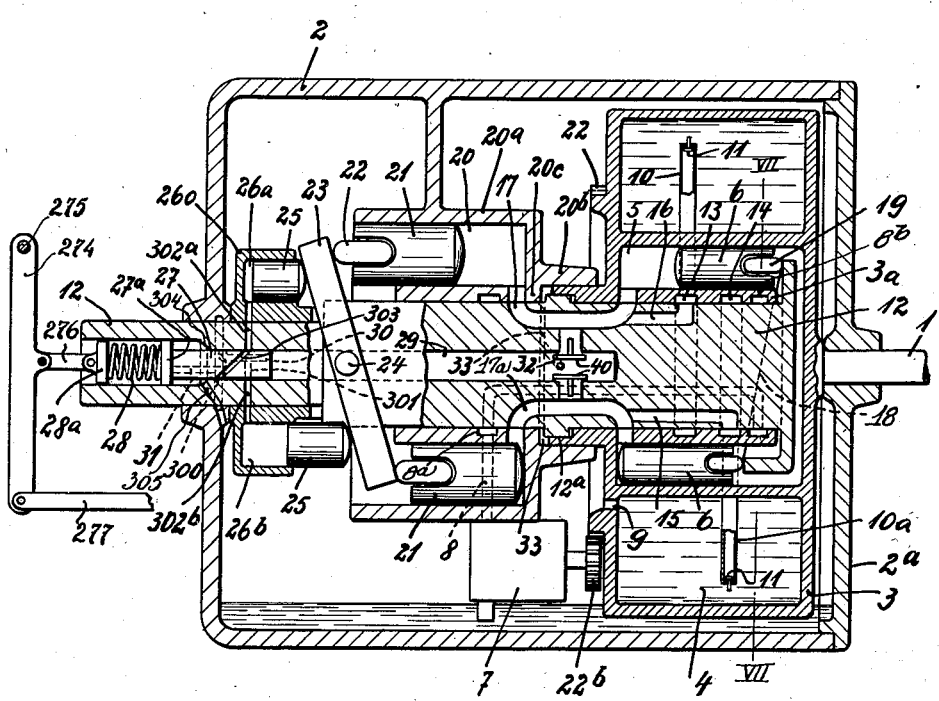

Referring now to the drawings, and first to Fig. 1, the casing 2 of the mechanism is closed at one end by an end plate 2a. 1 is the driving shaft which is mounted to rotate in a suitable bearing in the end plate 2a, and 3 is the pump unit. The casing of the pump unit defines a centrifugal reservoir 4 in which gas and other inclusions are separated from the driving liquid, and is equipped with a central sleeve 3a serving as a bearing for the inner portion of the driven shaft 12 which is of larger diameter. Pump pistons 6 are mounted to slide in the cylinders 5 of the pump unit, and controlled by a cam plate 18 at the inner end of the driven shaft 12, through the medium of anti-friction rollers 19 on the outer ends of the pistons.

The motor unit 20a which may be cast integral with the casing 2, has a bearing 20b at its inner end in which the outer end of sleeve 3a is mounted and from which a flange 20c extends as far as the bore of the motor unit 20a in which the thicker portion of driven shaft 12 is mounted. The outer and thinner end of the driven shaft 12 is supported in a bearing at the centre of an end plate which is cast integral with the casing, and arranged at the end opposite the detachable end plate 2a. The flange 20c, a shoulder 12a on the thicker inner portion of shaft 12, and the outer end of sleeve 3a, make up together a clearance 33 which is connected to a central bore 29 of the driven shaft by a passage 32.

20 are the cylinders, and 21 are the pistons, of the fixed motor unit 20a. The pistons, through antifriction rollers 22 at their ends, act directly on a swash plate 23 which is trunnioned on the driven shaft 12 at 24.

Mounted on the driven shaft 12 at the outer side of the swash plate 23 is a control unit 260, which comprises a pair of cylinders, 26a and 26b, shown in section, and a piston 25 in each cylinder.

Figure 7:
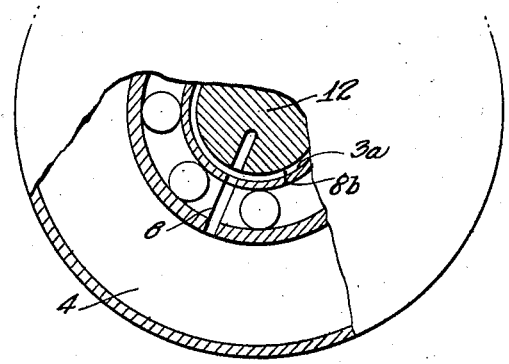
Fig. 7 is a cross section taken along the line VII—VII in Fig. 1.

The means for distributing the driving liquid will now be described. The liquid, normally oil, collects at the bottom of casing 2, or in a sump 200, Figs. 2 and 3, from which a pump 7, preferably a gear pump, driven from the pump unit 3 through an annular gear 22 on the outer end wall of the unit, and a pinion 22b on the shaft of the pump 7, delivers the liquid to the centrifugal reservoir 4 through a passage 8 which is provided partly in the casing of the motor unit, partly in the driven shaft 12, and partly in the casing of the pump unit. The connection between the passage 8 and the several rotary parts is effected by means of annular passages 8a and 8b which, as shown in Figs. 1, 2, and 7, may be provided in the casing portion surrounding the shaft, but which may be also provided in the shaft itself. The liquid is separated from its inclusions by centrifugal action. The separated air or gas is returned to the interior of casing 2 through a port, or ports 9. Pipes 10 and 10a open into the reservoir 4 near its perimeter, and are equipped with check valves 11 at their outer ends. The inner end of pipe 10 opens into an annular groove 13 in the seat of sleeve 3a from which passages 16 extend to passages 17 and 17a connecting the cylinders of the pump and motor units. The inner end of pipe 10a is connected to an annular groove 14 from which passages 15 extend to the passages 17 and 17a. For a given direction of rotation, the pipe 10 is connected to the suction, and the pipe 10a is connected to the delivery slide of the mechanism, and vice versa for the opposite direction.

The passages 17 and 17a are connected to the central bore 29 of the driven shaft 12 by radial bores with check valves 40.

A slide valve 27 is inserted in the outer end of bore 29 and equipped with a flange 27a at its outer end which bears against a shoulder in the bore 29 under the pressure of a spring 28. The seating face of the shoulder has an annular groove 304 which is connected to the interior of the casing 2 by a passage 305. The outer end of the spring is supported by a piston 28a which is mounted to slide in the bore 29 of the driven shaft 12. The tension of the spring 28 is regulated by means such as a lever 274 fulcrumed at 275, a link 276 connecting the lever to the piston 28a, and an operating rod 277 which, in the case of a vehicle, extends as far as the driver's seat, where it is handled. The valve 27 has a longitudinal bore 30 whose inner end opens into the bore 29 and whose outer end is connected to a radial bore 300. Another radial bore 301 is connected to the bore 30 at a point intermediate its ends and is diametrically opposite the bore 300 with respect to bore 30. An inclined annular groove 303 in the valve 27 is connected to another longitudinal bore 31 in the valve 27, but not to the bore 30. The bore 31 extends as far as the inner face of the flange 27a where it is connected to the groove 304 by a short radial bore.

In the position illustrated, which is the inner final position of valve 27, the radial bore 300 at the outer end of bore 30 is in line with one out of a set of radial passages 302 in the driven shaft 12 and in the boss of the control unit which extend from the central bore 29 in the driven shaft 12 to the cylinders 26a of the unit. This passage, 302a, is now connected to the central bore 29 through 30 and 300 and liquid under pressure is admitted to cylinder 26a. On the other hand, the diametrically opposite cylinder 26b is connected to the interior of the casing 2 through 31, 304 and 305. In the outer final position of the valve 27, the upper end of groove 303 is in line with passage 302a and the cylinder 26a is connected to the interior of the casing 2 through 302a, 303, and 31, while at the same time the cylinder 26b is connected to the bore 29 through bore 30, the radial bore 301, and passage 302b.

The operation of my mechanism is as follows:

Oil from reservoir 4 is admitted to the suction sides of cylinders 5 through passages 16 and 17 and 17a, as shown for the upper cylinder 5, and, under the pressure imparted to it by the pump 7, forces the piston 6 back as far as it will go on cam plate 18. The corresponding piston 21 of the motor unit is at the outer end of its stroke. As the pump unit 3 rotates with the driving shaft 1, the rollers 19 on the pump pistons 6 ascend on the cam plate 18 and force the oil out of the pump cylinders and into the motor cylinders through passages 17 and 17a. The torque from the driving shaft 1 is transmitted to the swash plate 23 by the means described, and transmitted to the driven shaft 12 through the trunnions 24.

As described, the passages 17 and 17a are connected to the central bore 29 through check valves 40 one of which opens for a given direction of rotation so that the central bore is filled with oil under pressure. This oil, through passage 32, penetrates into the clearance 33 and forms a cushion by which the thrust between sleeve 3a and the inner flange of bearing 20b is relieved. Differential action may be obtained by reducing the area at the end of sleeve 3a, as shown.

Variations of the oil pressure cause the valve 27 to slide in the bore 29 of the driven shaft and to admit oil to, and discharge oil from, the cylinders 26 as required for adjusting the swash plate 23. In the inner final position illustrated, the swash plate 23 is in the position in which the mechanism is reversed. This is the position the valve 27 occupies under the pressure of spring 28 whose tension, as mentioned, is regulated by rod 277. It follows that when a vehicle equipped with the mechanism according to the invention, is started, it runs in backward direction. This is prevented by setting the brake of the vehicle before starting the mechanism, until the pressure which gradually builds up in the central bore 29 of the driven shaft 12, has overcome spring 28, and moved the valve 27 in outward direction so far that the radial bore 300 at the outer end of bore 30 moves out of register with the passage 302a, and the intermediate radial bore 301 and the groove 303 register with the passages 302b and 302a, respectively. Liquid is now supplied to cylinder 26b and discharged from cylinder 26a. This occurs a short time after the mechanism has been started. The brake is now released and the vehicle moves in forward direction. When it is desired to start the vehicle in backward direction, the driver pulls the rod 277 until the tension of the spring 28 has become so high that the liquid pressure cannot shift the valve 27.

Referring now to Figs. 2 and 6, this type is modified in some details as compared with the first type. Thus, the driven shaft is built up from a shaft proper, 412, which is designed like the shaft 12 in Fig. 1 and has the central bore 429, but the bore is closed by a screwed-in plug 28b at its outer end. The cam plate 18 at the inner end of the driven shaft 412 is dispensed with. Instead, the driven shaft is connected to an intermediate disk 170 in which the passages 417 are formed, and the latter are connected to an extension of the central bore 429 by radial passages 171, with check valves 40 where the passages 171 open into the bore 429. A tubular shaft 120 is connected to the disk 170, a plug 121 is inserted in the inner end of the tubular shaft, and a journal 122 projects from the plug into a bore of driving shaft 401. Arranged on the inner end of the tubular shaft member 120 is a diagonal plate 180 which acts like cam plate 18.

The centrifugal reservoir 404 is designed as an independent part and has the sleeve 3a in which the tubular portion 120 of the driving shaft is seated, and the casing 403 is connected to the reservoir 404 by clutching members 3b. The pipes 10 and 10a are provided as described but only the pipe 10 is shown which opens into groove 14 in the sleeve 3a and is connected to the interior of tubular member 120 by a port 14a. A similar arrangement is shown for the pipe 10a (omitted) and the groove 13, with a port 13a. The valves 11 are not arranged at the ends of the pipes but in short ducts connecting the interior of the tubular member to the passages 171.

The means for operating the valve 427 are also modified. The lever 474 is provided keyed on its shaft 475 which is operated from the driver's seat by suitable links and levers (not shown). One end of springs 428 is connected to the free end of lever 474 and the tension of the spring is regulated by a screw 28c to which the other end of the spring is connected and which is inserted in a threaded hole of a bracket 28d. Two pins 270 are inserted in the valve 427 near its outer end and connected by a neck ring 271 which slides on an extension of the boss of control unit 260. The neck ring 271 is operated by a fork 273 on the shaft 475 which engages two pins 272 (only one shown) on the neck ring. The valve 427 is provided with the same bores as in Fig. 1 but the bore 31 opens at the unflanged outer end of the valve. The passage 305 is provided as described.

The swash plate 23 and the diagonal plate 180 are equipped with means for absorbing thrust by oil cushions. The swash plate 23 whose trunnion 24 is fixed in the driven shaft, with its ends inserted in bearing lugs 23a in the opening of the swash plate (Fig. 6) and has a hole 29a in line with the central bore 429 of driven shaft 412, is equipped with a movable annular member 35a which is seated on the boss of the swash plate and bears against the inner end face of the plate. The outer ends of connecting rods 22a are inserted in the annular member 35a with suitable knuckles, and their inner ends are similarly connected to the pistons 21 of the motor unit.

The inner end face of the swash plate 23 has a pair of sector shaped grooves 36a and 37a, as best seen in Fig. 6. Bores 172 in the driven shaft 412 connect the passages 171 to the individual sector grooves 36a and 37a through bores 39 in the swash plate and passages in the trunnion, as best seen in Fig. 6.

A similar equipment, with an annular member 35, sector grooves 36 and 37, and bores 38 connecting the individual grooves to the interior of tubular shaft 120 (the suction chamber) is provided for the diagonal plate 180. The annular member 35 of the diagonal plate is connected to the pistons 6 of the pump unit by knuckled connecting rods 19a.

By these means, the thrust forces between the pistons and the mating parts, i. e., the swash plate 23 and the diagonal plate 180, are entirely absorbed by oil under pressure, and the rollers 19 and 22 shown on the pistons in Fig. 1 may be dispensed with. All axially directed forces are absorbed by liquid under pressure.

When the shaft 475 is not operated, the pull of spring 428 places the valve 427 in its inner final or reversing position. The direction in which the vehicle is to run, is determined by the driver by moving the valve 427.

Referring now to Fig. 3, this type is designed substantially like the second type, and its parts will not be described except the separate centrifugal reservoir 140 by which it is distinguished. The chamber 404 is not a centrifugal reservoir in this type.

The reservoir 140 is an independent member which is mounted on a shaft 160 rotating in a bearing sleeve 150 at the lower end of a bracket 210 depending from the motor unit 20a. The shaft 160 is rotated from the shaft of pump 7 at any desired speed through suitable gearing (not shown). The pump 7 draws the leakage oil from the sump 200 at the bottom of casing 202 and delivers it to a passage 222 in the sleeve 150 which opens into a peripheral groove 221 in the sleeve. This groove is connected to a passage 220 in the shaft 160 which opens into the reservoir 140 in its boss 144 at 143. The reservoir has a radially extending passage 230 on one of its end walls whose opening, like the openings of pipes 10 and 10a, in reservoir 404, Fig. 2, is positioned near the perimeter of the reservoir 140. The oil from which air or gas has been separated, is delivered to a groove 260 in the sleeve 3a through a passage 240 in the shaft 160, a groove 241, and a passage 250 which is partly in the casing of the motor unit, in the disk 171, and in the sleeve 3a. From the groove 260, the liquid is delivered to the interior of shaft 120 through a port 261, and is then distributed though valves 11, etc., as described with reference to Fig. 2.

Referring now to Figs. 4 and 5, the shaft 160 is arranged symmetrically with respect to the reservoir 140 and its central boss 144, the two ends of the shaft projecting from the reservoir like trunnions which are supported in bearings 211 of a forked bracket 210'. The passages 220 and 240 are central bores in the respective trunnions. A radial partition 141 at one side of boss 144 speeds up the oil which is delivered to the reservoir from pump 7 through bore 220 and port 143.

By casting the parts of the reservoir unit integral with the reservoir, as in Figs. 3, 4, and 5, friction between the reservoir and the radially extending passage 230 is eliminated. By subdividing shaft 160 into a pair of trunnions at opposite sides of the central boss 144, as in Figs. 4 and 5, the cantilever arrangement of the reservoir in Fig. 3 is avoided, the shaft is not weakened by two parallel passages, and the connection of the ends of bores 220 and 240 to the pump 7 and the delivery passage 250 is facilitated.

It is understood that I am not limited to the combinations illustrated by way of example in the individual types. Thus, a separate centrifugal reservoir 140 might be provided in the first and the second type, and the reservoir itself may be arranged cantilever fashion as in Fig. 3, or with two trunnions as in Fig. 4. Similarly, the first type might be equipped with the cushioning means on the swash plate which have been illustrated only for the second and the third type.

Various changes may be made in the details disclosed in the foregoing specification without departing from the invention or sacrificing the advantages thereof.

I claim:—

1. In a hydraulic power transmission mechanism, a driving and a driven shaft, a pump unit operatively connected to said driving shaft, a motor unit operated by said pump unit, a swash plate operatively connected to said motor unit and to said driven shaft, and means controlled by the pressure of the driving liquid in the mechanism and arranged for rotation with said swash plate, for moving said swash plate out of its vertical position in opposite directions.

2. In a hydraulic power transmission mechanism, a driving and a driven shaft, a pump unit operatively connected to said driving shaft, a motor unit operated by said pump unit, a swash plate operatively connected to said motor unit and to said driven shaft, means including cylinders and pistons mounted to slide in said cylinders and acting on that side of said swash plate which is opposite the side acted on by said motor unit, a slide valve for controlling the admission of driving liquid to, and the discharge of driving liquid from, said cylinders, which slide valve is so arranged as to be acted on by the pressure of the driving liquid in one direction, and elastic means acting on said valve in the opposite direction.

3. In a hydraulic power transmission mechanism, a driving and a driven shaft, a pump unit operatively connected to said driving shaft, a motor unit operated by said pump unit, a swash plate operatively connected to said motor unit, and to said driven shaft, means including cylinders and pistons mounted to slide in said cylinders and acting on that side of said swash plate which is opposite the side acted on by said motor unit, a slide valve for controlling the admission of driving liquid to, and the discharge of driving liquid from, said cylinders, which slide valve is so arranged as to be acted on by the pressure of the driving liquid in one direction, elastic means acting on said valve in the opposite direction, and means accessible from the outside for regulating the pressure of said elastic means.

4. In a hydraulic power transmission mechanism, a driving and a driven shaft, a pump unit operatively connected to said driving shaft, a motor unit operated by said pump unit, a swash plate operatively connected to said motor unit, and to said driven shaft, means including cylinders and pistons mounted to slide in said cylinders and acting on that side of said swash plate which is opposite the side acted on by said motor unit, a slide valve for controlling the admission of driving liquid to, and the discharge of driving liquid from, said cylinders, which slide valve is so arranged as to be acted on by the pressure of the driving liquid in one direction, and elastic means acting on said valve in the opposite direction, and so arranged that the mechanism is held in reversed condition by increasing the pressure of said elastic means beyond the pressure of the driving liquid.

5. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, and centrifugal means for separating the leakage driving liquid from gaseous inclusions, and returning it to the mechanism under pressure.

6. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, centrifugal means for separating the leakage driving liquid from gaseous inclusions, and returning it to the mechanism under pressure, and a pump for delivering the leakage liquid to said centrifugal means under pressure.

7. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, and centrifugal means operatively connected to said pump unit, for separating the leakage driving liquid from gaseous inclusions, and returning it to the mechanism under pressure.

8. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions and centrifugal means on said pump unit, for separating the leakage driving liquid from gaseous inclusions, and returning it to the mechanism under pressure.

9. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, and a centrifugal reservoir having a delivery passage opening into the reservoir in the vicinity of its inner perimeter, for separating the leakage driving liquid from gaseous inclusions, and returning it to the mechanism under pressure.

10. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, a shaft, means operatively connected to said mechanism for rotating said shaft, and a centrifugal reservoir on said shaft having a delivery passage opening into the reservoir in the vicinity of its inner perimeter and connected to a passage in said shaft, for separating the leakage driving liquid from gaseous inclusions, and returning it to the mechanism under pressure.

11. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, separate centrifugal means for separating the leakage driving liquid from gaseous inclusions, and returning it to the mechanism under pressure, and means for rotating said centrifugal means from said mechanism.

12. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, a centrifugal reservoir, adapted to separate the leakage driving liquid from gaseous inclusions, parts rigidly connected to said reservoir and defining its inlet and discharge passages, and means for rotating said reservoir from said mechanism.

13. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, a cylindrical, centrifugal reservoir, a radial partition in said reservoir, adapted to separate the leakage driving liquid from gaseous inclusions, parts rigidly connected to said reservoir and defining its inlet and discharge passages, and means for rotating said reservoir from said mechanism.

14. In a hydraulic power transmission mechanism, a driving and a driven shaft, a pump unit operatively connected to said driving shaft, a motor unit operated by said pump unit, a swash plate operatively connected to said motor unit and to said driven shaft, means controlled by the pressure of the driving liquid in the mechanism for moving said swash plate out of its vertical position in opposite directions, a centrifugal reservoir, adapted to separate the leakage driving liquid from gaseous inclusions, means for rotating said reservoir from said mechanism, and means for supplying oil to, and for discharging oil from, said reservoir, arranged within said reservoir and adapted to rotate with said reservoir.

EMIL GÖLZ.